Jan. 3, 1956 A. A. HUTCHINS 2,729,038
ROTARY ABRADING MACHINE HEADS
Filed Oct. 30, 1953
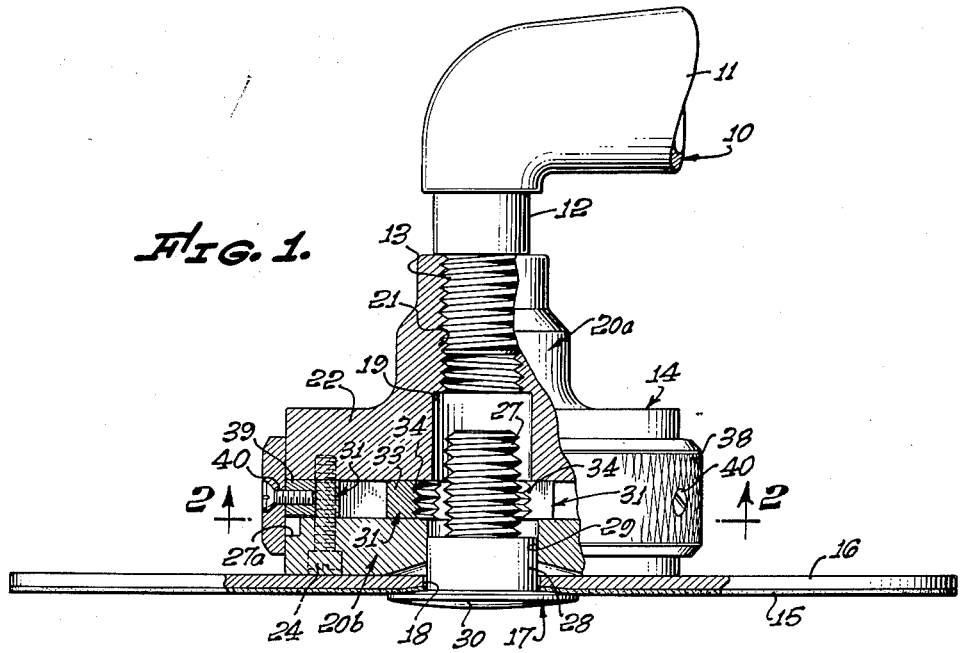
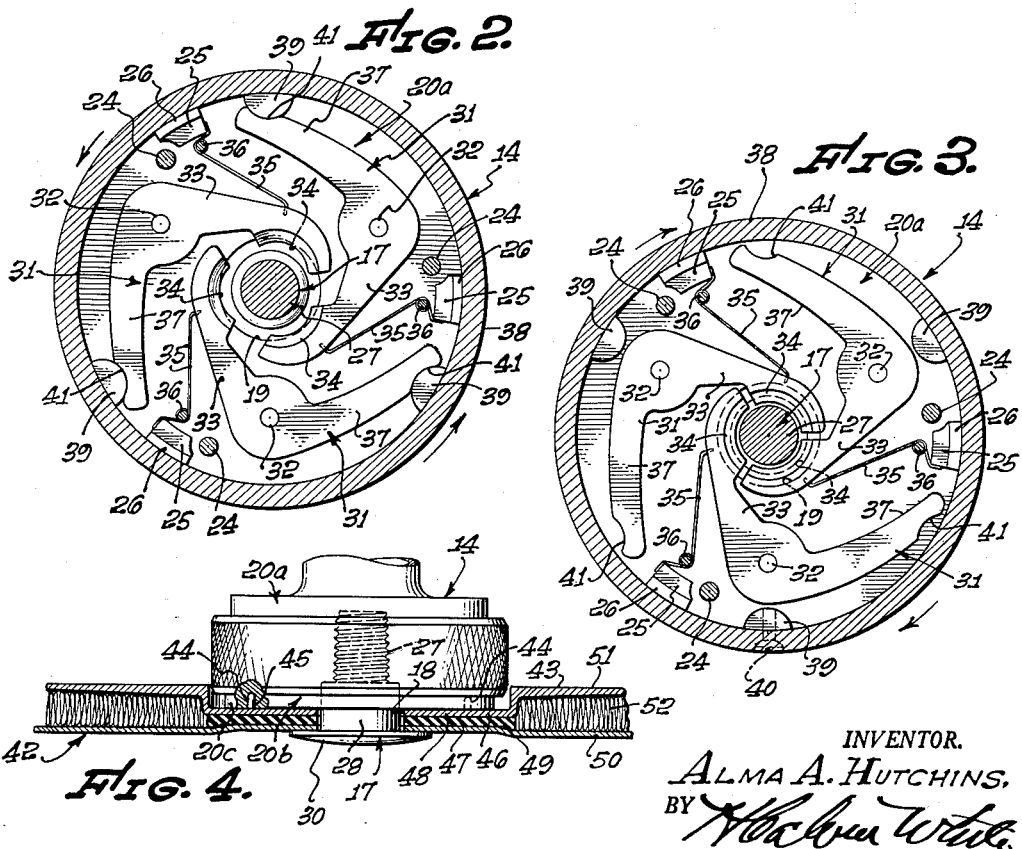
INVENTOR.
ALMA A. HUTCHINS.
BY
ATTORNEY.

United States Patent Office 2,729,038
Patented Jan. 3, 1956

2,729,038

ROTARY ABRADING MACHINE HEADS

Alma A. Hutchins, Pasadena, Calif.

Application October 30, 1953, Serial No. 389,307

14 Claims. (Cl. 51—197)

This invention relates to improved apparatus for attaching abrasive discs to a power driven rotary sanding or buffing machine.

In smoothing out damaged automobile bodies prior to repainting, as well as in various other types of work, it is customary to employ an electrically driven rotary type of sanding or buffing machine, to which is removably mounted an abrasive disc for engaging and acting on the work. These discs of course wear out and must be replaced very frequently. A major object of the present invention is therefore to provide improved means for attaching such a disc to a power tool, in a manner permitting very rapid attachment or disconnection of the disc, while at the same time assuring a completely reliable and positive connection to the tool in use.

Structurally, a device embodying the invention may include a head which is adapted for attachment to the driving shaft of a rotary tool, a clamping element removably attachable to the head and acting to clamp the abrasive disc to the head, and means forming a quickly made or broken connection between the head and clamping element. This connection desirably includes a retaining member which is carried by the head and is movable laterally relative thereto between a position of holding engagement with the clamping element and a released position in which the clamping element and disc may be removed from the head. Either the clamping element or retaining member, and preferably both, are threaded, to provide for their effective interconnection at any of numerous different relative axial positions. For best results, the head carries a number of the retaining members, each typically having one partial or interrupted threads and forming with the threads of the other members a composite essentially annular threaded unit. These members may engage the outer side of the clamping element, and serve as a composite threaded nut engaging a screw portion of the clamping element.

The retaining members may be actuable into and out of active holding positions by means of a manually operated actuating head. This member may comprise a rotary ring disposed about and rotatable relative to the head. Desirably, the actuation is effected through a camming mechanism, which may pivotally move the retaining members into and out of their active positions.

I find it highly desirable to so design the actuating mechanism as to be automatically operable to disc holding position upon starting of the motor of the driving unit. This may be effected by inertia actuation of the mechanism upon such starting of the motor. Also, the device is desirably constructed to centrifugally actuate the retaining members into progressively tightening engagement with the clamping element upon rotation of the apparatus in use.

Certain additional features of the invention have to do with a unique way of mounting an abrasive disc to the head in front of a cushoin or pad, and in such relation as to permit rotation of the disc relative to the pad in the event that the disc engages a portion of the work surface which offers unusual resistance to turning of the disc.

The above and other features and objects of the present invention will be better understood from the following detailed description of the typical embodiments illustrated in the accompanying drawing, in which:

Fig. 1 is a side partly sectional fragmentary view of a buffing machine embodying the invention;

Fig. 2 is a transverse section taken on line 2—2 of Fig. 1, and showing the locking or holding elements of the device in released positions;

Fig. 3 is a view corresponding to Fig. 2, but showing the locking or holding elements in their active positions; and Fig. 4 is a view similar to Fig. 1, but showing a different type of abrading unit attached to the rotary power driven head of the device.

Referring first to Fig. 1, I have illustrated fragmentarily at 10 a conventional portable rotary buffing and sanding machine, including a housing 11 containing an electric motor (not shown), and carrying a rotary drive shaft 12 driven by the motor. This drive shaft has a threaded end 13 to which is removably mounted a head 14, for carrying the usual abrasive buffing disc 15. The circular disc 15 may be retained against deformation by a rigid circular metal backing plate or disc 1. The buffing disc 15 and backing plate 16 are removably fastened to head 14 by a clamping bolt or element 17, which extends through central openings 18 in the abrasive disc and backing element, and projects into a central axial recess 19 formed in the head 14.

Head 14 includes a rigid body, which may typically be formed of two rigidly interconnected sections 20a and 20b. The first of these sections 20a is internally threaded at 21 for connection to the threaded end of drive shaft 12. Body section 20b is annular and of a diameter corresponding to a transverse portion 22 of section 20a, and is fastened to section 20a in parallel but spaced relation thereto by screws 24. Three or more circularly spaced lugs 25 on body section 20a engage body section 20b in a manner maintaining these two body sections in the spaced relation illustrated in Fig. 1. Each of the lugs 25 may have a radially outer axially projecting portion 26, which is receivable within an outer annular recess 27a in body section 20b, to retain the two body sections 20a and 20b in the illustrated axially alined positions.

The two body sections 20a and 20b have alined axially extending central openings, which form together the outwardly opening axial recess 19 for receiving clamping element 17. This clamping element or screw 17 terminates inwardly at a threaded inwardly projecting stem portion 27, and outwardly beyond that threaded portion has an enlarged diameter externally cylindrical portion 28 which is received within an internally cylindrical bore 29 formed within body section 20b. The diameter of portion 28 of the clamping bolt is substantially the same as or very slightly smaller than, the diameter of bore 29, to accurately locate bolt 17 centrally within the head 14. At its outer end, clamping element 17 has an enlarged transversely extending annular head 30, which bears against a central portion of abrasive disc 15 to retain the abrasive disc and backing element 16 on the head.

The clamping bolt 17 is releasably attached to head 14 by means of several, typically three, evenly circularly spaced retaining or holding elements 31. These holding elements comprise three elongated levers pivotally mounted by three circularly spaced axially extending pins 32 at locations axially between body sections 20a and 20b. Pivot pins 32 are mounted in any suitable manner in fixed relation to the two sections 20a and 20b, as by reception of opposite ends of the pins in opposed recesses in the body sections. The pins mount the levers 31 for swinging movement between their released positions of Fig. 2, and their active holding positions of Fig. 3. Levers 31 have first radially inwardly extending arms 33, each of which has formed at its inner end a series of interrupted or only partially circular threads 34 shaped in accordance with threads 27 of the clamping bolt 17. Each of the threaded portions 34 of the individual pivotal holding elements 31 engages only a portion of the circular extent of threads 27 on element 17, typically about ⅓ of the circular extents of those threads, so that the three thread portions 34 of the holding elements act together in their Fig. 3 positions to form essentially a composite threaded nut positively holding bolt 17 against outward withdrawal from head 14. Three wire springs 35 mounted about individual posts 36 bear against arm 33 of holding elements 31, to yieldingly urge the partially threaded portions 34 of holding elements 31 into operative holding engagement with bolt 17. Holding elements 31 are releasable from their Fig. 3 position to their Fig. 2 position by radially inward actuation of outer arms 37 of the holding elements. For simultaneously actuating these arms 37 of the holding elements radially inwardly, actuating sleeve 38 is rotatably carried by body sections 20a and 20b and carries three evenly spaced inwardly projecting cam lugs 39 acting to cam arms 37 inwardly to their Fig. 2 positions upon rotation of sleeve 38 and its carried lugs 39. Cam lugs 39 may typically be attached to sleeve 38 by individual screws 40. These cam lugs are preferably receivable within notches 41 at the outer ends of arms 37 in the Fig. 2 released condition of the device.

In using the device of Figs. 1 to 3, head 14 is first threadedly connected to drive shaft 12, following which abrasive disc 15 and backing plate 16 are releasably connected to the head by means of clamping screw 17. For thus attaching discs 15 and 16 to the head, outer sleeve 38 of the head is first rotated to its Fig. 2 position, and then discs 15 and 16 are placed across the head, and the screw or bolt 17 is inserted through the central openings of the discs and into its Fig. 1 position within the head. Sleeve 38 is then rotated from its Fig. 2 position to its Fig. 3 position, to allow inward swinging movement of the threaded portions 34 of elements 31 into holding engagement with the threaded portion 27 of bolt 17, to positively hold that bolt against outward withdrawal from the head. The motor of the portable machine 10 may then be energized, to rotate shaft 12, head 14, and discs 15 and 16, so that the rotating disc 15 may be used to buff a desired work surface.

Threads 13, 21, 27 and 34 are all so designed that the threaded connections which they form tend to be tightened by the rotation of drive shaft 12 when the device is in use. Also, the sleeve 38 is mounted sufficiently loosely on the body of head 14 that the body 20a, 20b acts to turn relative to sleeve 38 when the motor is first energized and shaft 12 first commences to turn. That is, the inertia of sleeve 38 is such as to effect the desired relative rotation between body 20a, 20b when the motor is energized. The various parts of the device are so designed that such relative rotation of sleeve 38 upon starting of the device acts to rotate the sleeve from its Fig. 2 position to its Fig. 3 position, so that even if the operator does not manually rotate sleeve 38 to the Fig. 2 disc holding position, the rotation of the device will itself effect such rotation and assure positive holding of the screw 30 and discs 15 and 16. It is further noted that the individual holding elements 31 are so dimensioned and proportioned that the centrifugal force exerted against their arms 37 upon powered rotation of head 14 tends to swing elements 31 to and beyond their Fig. 3 positions, so that this centrifugal force assures very tight gripping engagement of screw 17 by thread portions 34 of elements 31 when the device is in use.

Fig. 4 shows the head 14 of Figs. 1 to 3 with a different type of abrasive disc assembly 42 attached thereto. This assembly 42 includes a rigid metal backing plate or disc 43 having the illustrated cross sectional configuration and having two or more axially projecting pins 44 receivable within holes 45 in body section 20b, to positively retain plate 43 in fixed rotary position relative to the body of head 14. A radially inner annular portion 46 of backing plate 43 may carry an annular essentially flat ring 47 formed of rubber or other suitable friction material, and fastened tightly to the plate as by cementing their engaging surfaces together at 48. This friction ring 47 may have an outer annular increased thickness portion 49. The central portion of abrasive sanding disc 50 is held in annular engagement with friction ring 47 by the same clamping element or bolt 17 shown in Fig. 1.

Radially outwardly beyond its central portion 47, backing plate 43 has an annular axially offset portion 51, to which is cemented or otherwise fastened in fixed relation an annular cushion or pad 52. This pad may typically comprise an annular piece of carpet-like material, having a carpet-like pile offering a cushion backing to abrasive disc 50.

In using the arrangement of Fig. 4, cushion 52 allows deformation of the abrasive or sanding disc 50, as is desirable in a finish sanding operation. Clamping bolt 17 is not tightened as far as possible into head 14, but is purposely left sufficiently loose to allow slippage of abrasive disc 50 relative to friction ring 47 and cushion 52 if the abrasive disc engages more than a predetermined amount of resistance to rotation. The engagement between disc 50 and friction ring 47 then becomes a slip clutch, whose slippage force may be varied by adjustment of clamping screws 17. It has been found that, if backing plate 43 is positively retained in fixed rotary position relative to the body of head 14, as by pins 44, clamping screw 17 will not tighten as a result of rotation of the head in use, and consequently a predetermined setting of the slip arrangement may be maintained. Such is not the case where the backing plate is free to rotate relative to head 14, as in Fig. 1. With the Fig. 4 type of disc assembly, the previously mentioned centrifugal actuation of holding elements 31 into active holding engagement with threads 27 assures retention of screws 17 against tightening rotation relative to the head.

I claim:

1. Apparatus for attaching an abrasive disc to a rotary power driven abrading tool comprising a head adapted for attachment to a rotary drive member of said tool, a clamping member removably connectable to said head and adapted to extend through a central opening in said disc and clamp it to the head, retaining means carried by the head and operable to releasably retain said clamping member thereto and movable relative to the head between an active position holding said member and disc to the head and an inactive position permitting removal of the disc and member from the head, and means for actuating said retaining means between said positions, said clamping member and retaining means having threads which are interengageable in said active position of the retaining means to hold said member and disc to the head, and said retaining means being movable essentially transversely of the axis of said threads into said active position.

2. Apparatus as recited in claim 1, in which said retaining means comprise a plurality of retaining elements movable relative to said head and having complementary partially circular threads.

3. Apparatus as recited in claim 2, in which said actuating means comprise a manually actuable element movable relative to said head, and cam means for moving said retaining elements in response to movement of said manually actuable element.

4. Apparatus for attaching an abrasive disc to a rotary power driven abrading tool comprising a head adapted for attachment to a rotary drive member of said tool, a clamping screw adapted to extend through said disc and having a threaded stem projecting into said head and a flange at an outer side of said disc for retaining the disc thereto, a plurality of complementary partial nut elements individually movable relative to said stem transversely thereof between inner active positions of holding engagement with said stem and outer released positions, a ring disposed about and rotatable relative to said head, and cam means operable to actuate said nut elements between said positions in response to rotation of said ring about the head.

5. Apparatus for attaching an abrasive disc as recited in claim 9, in which said head is hollow and contains said nut elements, said apparatus including means mounting said nut elements for individual pivotal movement relative to said head, and spring means urging said nut elements toward said active positions, said cam means including cam projections on said ring engageable with said nut elements, said nut elements being constructed to be centrifugally actuated against said stem in response to rotation of the head, said ring being actuable by inertia relative to said head in a direction actuating said nut elements to active positions upon starting of rotation of the head.

6. Apparatus for attaching an abrasive disc to a rotary power driven abrading tool comprising a head adapted for attachment to a rotary drive member of said tool, a clamping member removably connectable to said head and adapted to extend through a central opening in said disc and clamp it to the head, retaining means carried by the head and operable to releasably retain said clamping member thereto and movable relative to the head between an active position holding said member and disc to the head and an inactive position permitting removal of the disc and member from the head, and means for actuating said retaining means between said positions, said clamping member comprising a screw having a threaded shank received in said head and a clamping flange received at an outer side of said disc, and said retaining means comprising a plurality of partially threaded complementary elements engageable with said screw and individually movable transversely of the screw.

7. Apparatus for attaching an abrasive disc to a rotary power driven abrading tool comprising a head adapted for attachment to a rotary drive member of said tool, a clamping member removably connectable to said head and adapted to extend through a central opening in said disc and clamp it to the head, retaining means movably carried by the head and releasably engageable in holding relation with said clamping member, and means mounting said retaining means to the head for movement relative thereto between an active position engaging said member in holding relation to retain the member and disc to the head and an inactive position out of said holding engagement with the member and permitting its removal from the head, said last recited means movably mounting the retaining means to the head even when said clamping member is detached from the head.

8. Apparatus as recited in claim 7, including a manually operable element for actuating said retaining means between said positions and mounted to said head for movement relative thereto and relative to the retaining means.

9. Apparatus as recited in claim 8, in which said actuating element comprises a cam element acting upon movement relative to the head to cam said retaining means between said positions.

10. Apparatus for attaching an abrasive disc to a rotary power driven abrading tool comprising a head adapted for attachment to a rotary drive member of said tool, a clamping member removably connectable to said head and adapted to extend through a central opening in said disc and clamp it to the head, retaining means carried by the head and operable to releasably retain said clamping member thereto and movable relative to the head between an active position holding said member and disc to the head and an inactive position permitting removal of the disc and member from the head, and inertia operated actuating means responsive to starting of rotation of said head to actuate said retaining means to said active position.

11. Apparatus as recited in claim 10, in which said inertia operated means comprise an element mounted to said body for rotary movement relative thereto and operable by said movement to actuate said retaining means to said active position, said element being inertia actuable relative to the body in a direction actuating the retaining means to said active position upon starting of rotation of the head.

12. Apparatus as recited in claim 7, in which said retaining means are centrifugally actuable against said clamping member into tight holding engagement therewith as a result of rotation of said head in use.

13. Apparatus as recited in claim 7, in which said retaining means include a retaining element mounted to the head for swinging movement about an axis essentially parallel to the head axis, said retaining element having a first arm engageable in holding relation with said clamping member and a second and outer arm which is centrifugally actuable outwardly in a direction urging the inner arm into tight holding engagement with the clamping member upon rotation of the head in use.

14. Apparatus as recited in claim 13, including a cam member mounted to the head for relative rotary movement and operable by said movement to cam said second arm of the retaining element inwardly and thereby release said first arm from holding engagement with the clamping member.

References Cited in the file of this patent

UNITED STATES PATENTS

| | | |
|---|---|---|
| 2,480,886 | Stover | Sept. 6, 1949 |
| 2,501,524 | Jones | Mar. 21, 1950 |
| 2,620,604 | Veit | Dec. 9, 1952 |
| 2,620,605 | Holford | Dec. 9, 1952 |